United States Patent
Suzuki et al.

(10) Patent No.: US 7,145,694 B2
(45) Date of Patent: Dec. 5, 2006

(54) IMAGE PROCESSING APPARATUS AND METHOD

(75) Inventors: Hiroyuki Suzuki, Kawasaki (JP); Koichi Fujimura, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 283 days.

(21) Appl. No.: 09/834,623

(22) Filed: Apr. 16, 2001

(65) Prior Publication Data
US 2001/0021034 A1    Sep. 13, 2001

Related U.S. Application Data

(63) Continuation of application No. PCT/JP99/00908, filed on Feb. 25, 1999.

(51) Int. Cl.
G06K 15/00 (2006.01)
H04N 1/40 (2006.01)
H04N 1/405 (2006.01)

(52) U.S. Cl. .................. 358/2.1; 358/3.05; 358/462

(58) Field of Classification Search .............. 358/1.9, 358/2.1, 2.99, 3.09, 3.1, 3.11, 3.13–3.16, 358/3.24, 3.26–3.28, 405, 450, 462, 465, 358/531–534, 537–538, 540, 3.03–3.05, 358/443, 448, 461, 518, 522, 530, 453; 382/173, 382/176, 182, 199, 221, 254, 266–269; 345/418
See application file for complete search history.

(56) References Cited

U.S. PATENT DOCUMENTS

| 4,876,610 | A | * | 10/1989 | Ohsawa et al. ............. 358/443 |
| 4,958,218 | A | * | 9/1990 | Katayama et al. .......... 358/530 |
| 5,014,124 | A | * | 5/1991 | Fujisawa .................... 358/530 |
| 5,222,154 | A | * | 6/1993 | Graham et al. ............. 382/162 |
| 5,266,805 | A | * | 11/1993 | Edgar ......................... 250/330 |
| 5,555,362 | A | * | 9/1996 | Yamashita et al. .......... 715/517 |
| 5,815,287 | A | * | 9/1998 | Yamada ...................... 358/448 |
| 5,920,646 | A | * | 7/1999 | Kamon ........................ 382/173 |
| 5,949,922 | A | * | 9/1999 | Wada et al. ................. 382/295 |
| 6,160,913 | A | * | 12/2000 | Lee et al. .................... 382/176 |
| 6,178,010 | B1 | * | 1/2001 | Takenouchi et al. ......... 358/1.9 |
| 6,333,788 | B1 | * | 12/2001 | Yamada et al. ............. 358/1.15 |

OTHER PUBLICATIONS

Patent Abstract of Japanese Application 10257310, published Sep. 25, 1998.

(Continued)

*Primary Examiner*—David Moore
*Assistant Examiner*—James A. Thompson
(74) *Attorney, Agent, or Firm*—Staas & Halsey LLP

(57) ABSTRACT

An apparatus and a method for generating high-quality binary image are provided. An input unit inputs a binary image as a multi-valued image. A halftone dot image area map creating unit searches for a halftone dot image area that may be in the multi-valued image and creates a halftone dot image area map. A line drawing/character area map creating unit searches for a line drawing/character image area that may be in the multi-valued image and creates a line drawing/character image area map. A halftone dot image binarizing unit binarizes an input image corresponding to the halftone dot image area map while suppressing input read error that may occur when said input unit inputs the binary image, and generates a binarized halftone dot image. A line drawing/character smoothing unit smoothes a jaggy contained in an input image corresponding to the line drawing/character area map, and generates a binarized line drawing/character image. An image combining unit combines the binarized halftone dot image and the binarized line drawing/character image.

16 Claims, 16 Drawing Sheets

OTHER PUBLICATIONS

Patent Abstract of Japanese Application 10336441, published Dec. 18, 1998.
Patent Abstract of Japanese Application 03046461, published Feb. 27, 1991.
Patent Abstract of Japanese Application 8139918, published May 31, 1996.
Patent Abstract of Japanese Application 10302062, published Nov. 13, 1998.
Patent Abstract of Japanese Application 08051537, published Feb. 20, 1996.
Patent Abstract of Japanese Application 10228536, published Aug. 25, 1998.
Patent Abstract of Japanese Application 10173916, published Jun. 26, 1998.
Patent Abstract of Japanese Application 10336443, published Dec. 18, 1998.
English Patent Abstracts of Japan of Publication No. 03-46461 dated Feb. 27, 1991.
English Patent Abstracts of Japan of Publication No. 10-257310 dated Sep. 25, 1998.
English Patent Abstracts of Japan of Publication No. 10-336441 dated Dec. 18, 1998.
Japanese Office Action issued by the Japanese Patent Office on Sep. 27, 2005 in Japanese Patent Application No. 2000-601829 (Japanese national phase of PCT/JP99/00908) corresponding to the present above-identified pending US patent application, including English language translation of relevant portions thereof, 4 pages.

* cited by examiner

■ : PIXEL p1 THAT IS ORIGINALLY HALFTONE DOT

▒ : PIXEL PAINTED OUT BY EXPANSION PROCESS

▨ : PIXEL THAT IS IN BOUNDARY BOX AND IS PAINTED OUT

IMAGE PROCESSING APPARATUS AND METHOD

This application is a continuing application, filed under 35 U.S.C. § 111(a), of International Application PCT/JP99/00908, filed Feb. 25, 1999.

BACKGROUND OF THE INVENTION

1. Field of the Invention

The present invention relates to a method and an apparatus for processing an image, and more particularly to a method and an apparatus for processing a binary image.

2. Description of the Related Art

Generally, a scanner is configured as follows. Light is projected onto figures drawn or printed on paper or photographs, and light reflected thereby is received by a light-receiving element such as a CCD (Charge-Coupled Device). Then, the tone of color is converted into the intensity of light for digitization.

An image (halftone dot image) of a binary figure or photograph is printed so that a large number of halftone dots consisting of a plurality of dots are formed on paper at a given pitch. A monotone image is printed so that a large halftone dot (consisting of a comparatively large number of dots) is arranged for a dark portion of the monotone image, and a small halftone dot (consisting of a comparatively small number of dots) is arranged for a light portion thereof.

Generally, the scanner reads a binary document in which dot images, line drawings and characters coexist as an aggregate of fine dots. A (input) resolution indicates how finely the document can be read.

In newspaper corporations and desktop publishing (DTP) corporations, when a photographic printing paper or a binary document transmitted from a remote place such as a facsimile image is optically read by the scanner, it is desired to input images in an image size that matches the sheet insertion size. In other words, it is desired to input images at a desired resolution.

However, in practice, the scanner can read the binary document only at a fixed resolution because of a restriction on hardware. Thus, the binary document is once input at the fixed resolution, and the image size thereof is changed, so that a desired binary-valued document can be generated.

However, in that case, a chess-board like distortion may occur when input binary data is decimated at irregular intervals or is changed in size for enlargement or reduction.

An improved technique taking the above into account has been proposed. This technique does not change the document size based on input binary data of the document. Instead, the proposed technique inputs multi-valued data of the binary document so as to match the sheet insertion size (the gray scale of the halftone dot is divided into, for example, 256 gradation levels). Then, the multi-valued data is converted into binary data in a post process. The proposed technique prevents occurrence of a chess-board like distortion resulting from decimation and change of size.

In the proposed technique, a binary image is generated by simple binarization (in which a threshold value of 127 is used for 256 gradation levels). However, simple binarization frequently degrades images, which may include a Moiré that occurs in a halftone dot image or a jaggy noise that occurs in a line drawing or a character (a portion that should be originally a straight line has a rough contour).

Conventionally, simple binarization is employed without definitely separating a halftone dot image part and a line drawing/character part from each other. However, it is desired that the halftone dot image part and the line drawing/character part are processed by logically different manners in order to obtain high-quality output.

Thus, even if improvement in the image quality is attempted by simultaneously employing a Moiré smoothing process as measures against Moiré of halftone dot images and a contour emphasizing process as measures against the jaggy noise in the line drawing/character part, these processes may affect each other, and the expected effects would not be obtained.

SUMMARY OF THE INVENTION

Taking the above into consideration, an object of the present invention is to provide an image processing apparatus capable of producing high-quality binary images in such a manner that a halftone dot image part and a line drawing/character part are separated from each other and are subject to respective, most suitable image processing.

Another object of the present invention is to provide an image processing method capable of producing high-quality binary images in such a manner that a halftone dot image part and a line drawing/character part are separated from each other and are subjected to respective, most suitable image processing.

To accomplish the first object, according to the present invention, there is provided an image processing apparatus that processes a binary image, comprising: an input unit that inputs the binary image as a multi-valued image; a halftone dot image area map creating unit that searches for a halftone dot image area that may be in the multi-valued image and creates a halftone dot image area map; a line drawing/character area map creating unit that searches for a line drawing/character image area that may be in the multi-valued image and creates a line drawing/character image area map; a halftone dot image binarizing unit that binarizes an input image corresponding to the halftone dot image area map while suppressing input read error that may occur when the input unit inputs the binary image, and generates a binarized halftone dot image; a line drawing/character smoothing unit that smoothes a jaggy contained in an input image corresponding to the line drawing/character area map, and generates a binarized line drawing/character image; and an image combining unit that combines the binarized halftone dot image and the binarized line drawing/character image.

To accomplish the second object, according to the present invention, there is provided an image processing method that processes a binary image, comprising the steps of: inputting the binary image as a multi-valued image; searching for a halftone dot image area that may be in the multi-valued image and creating a halftone dot image area map; searching for a line drawing/character image area that may be in the multi-valued image and creating a line drawing/character image area map; binarizing an input image corresponding to the halftone dot image area map while suppressing input read error that may occur at the time of inputting the binary image and thus generating a binarized halftone dot image; smoothing a jaggy that may be contained in an input image corresponding to the line drawing/character area map and thus generating a binarized line drawing/character image; and combining the binarized halftone dot image and the binarized line drawing/character image.

The above and other objects, features and advantages of the present invention will become apparent from the following description when taken in conjunction with the

DESCRIPTION OF THE PREFERRED EMBODIMENTS

A description will now be given of embodiments of the present invention with reference to the accompanying drawings.

Figure 1:
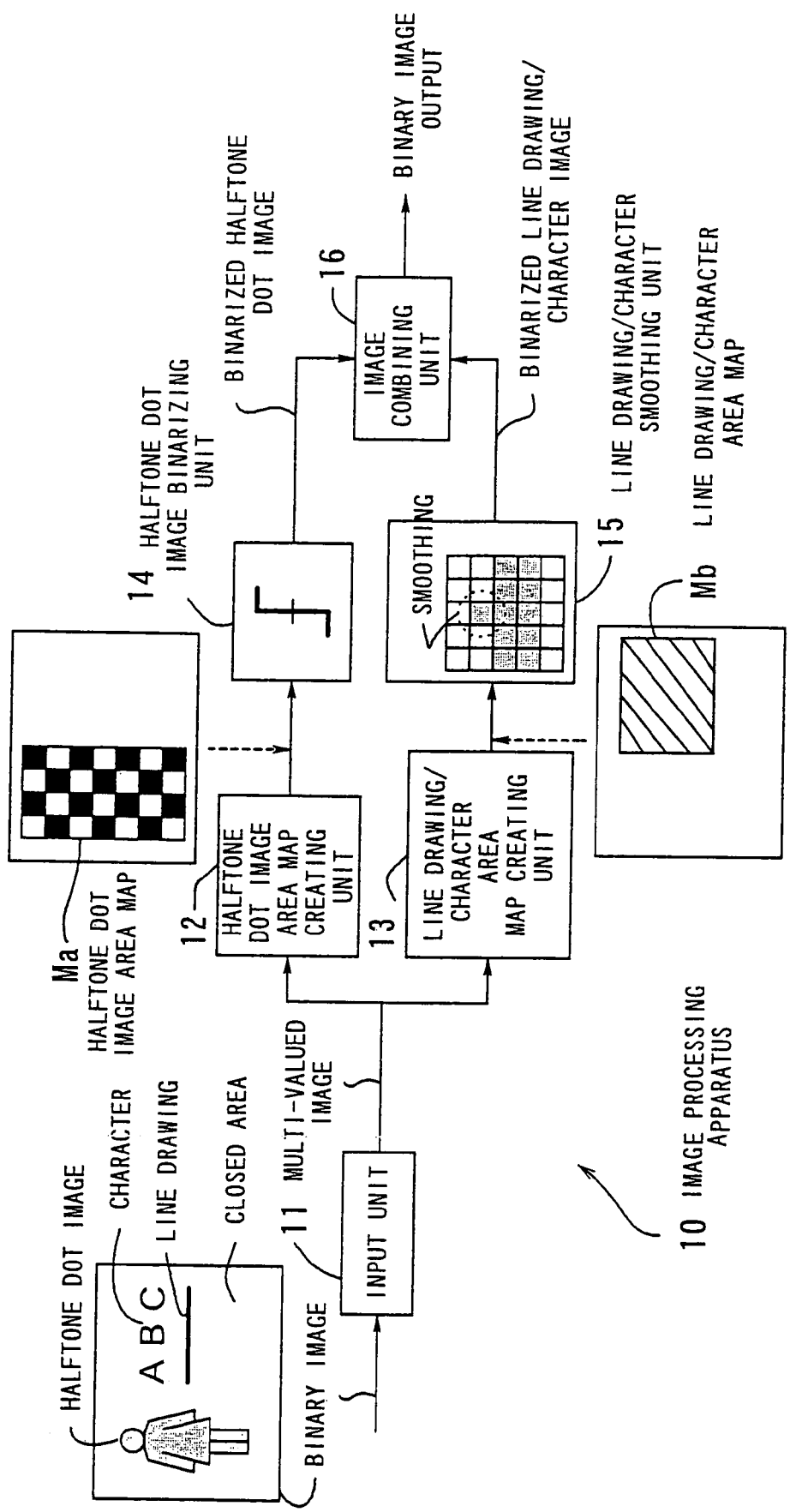
FIG. 1 is a diagram illustrating the principles of an image processing apparatus of the present invention.

FIG. 1 is a diagram illustrating the principles of an image processing apparatus of the present invention. An image processing apparatus 10 inputs a binary image of a halftone dot and a line drawing/character as a multi-valued image, and then performs a binarizing process.

An input unit 11 corresponds to a scanner or the like and inputs a binary image as multi-valued image. More particularly, the input unit 11 reads a binary document at a resolution equal to 256 gradation levels so as to match a sheet insertion size. The multi-valued image thus read is stored in the input unit 11.

A halftone dot image area map creating unit 12 searches for a halftone dot image area from the multi-valued image, and creates a halftone dot image area map Ma. The map Ma is used to recognize the position of the halftone dot image area in the binary document.

A line drawing/character area map creating unit 13 searches for a line drawing/character area from the multi-valued image, and creates a line drawing/character area map Mb. The map Mb is used to recognize the position of the line drawing/character area in the binary document. More particularly, the map Mb is used to recognize an edge portion of a line drawing/character.

A halftone dot image binarizing unit 14 binarizes an input image corresponding to the halftone dot image are map Ma (that is, an input image of the halftone dot image area in the input document), while suppressing an input read error that my occur when the input binary image is read by the input unit 11. Then, the halftone dot image binarizing unit 14 outputs a binarized halftone dot image thus generated.

The values of the halftone dot pixels in the halftone dot image area are not absolutely determined but depend on a condition of the document placed on the scanner and an influence of a physical factor of the CCD elements. Taking the above into account, the halftone dot image binarizing unit 14 does not simply binarize the halftone dot image but executes the most suitable binarization process that functions to suppress input read error as described above. The details of the most suitable binarization process will be described later.

A line drawing/character smoothing unit 15 smoothes a jaggy of an input image corresponding to the line drawing/character area map Mb (that is, an input image of the line drawing/character area in the input document), and thus generates a binarized line drawing/character image.

An image combining unit 16 combines the binarized halftone dot image and the binarized line drawing/character image into a combined binarized image, which is then stored in the unit 16.

Now, the halftone dot image area map creating unit 12 is described below. This unit 12 automatically recognizes the individual halftone dots of the multi-valued image obtained by reading the input binary image by the input unit 11 that may be a scanner. After recognition, the unit 12 makes a list of halftone dot information about each halftone dot, and stores it therein. The halftone dot information may include, for example, center-of-gravity information (the coordinates of the center of gravity of each halftone dot) and boundary box information (the coordinates of a boundary box). Thus, the unit 12 makes, for each halftone dot, a list of the coordinates of the center of gravity and the coordinates of a boundary box. The boundary box is a rectangle that circumscribes the halftone dot. Then, the unit 12 eliminates an erroneously recognized halftone dot by referring to the coordinates of the centers of gravity of the halftone dots.

Figure 2:
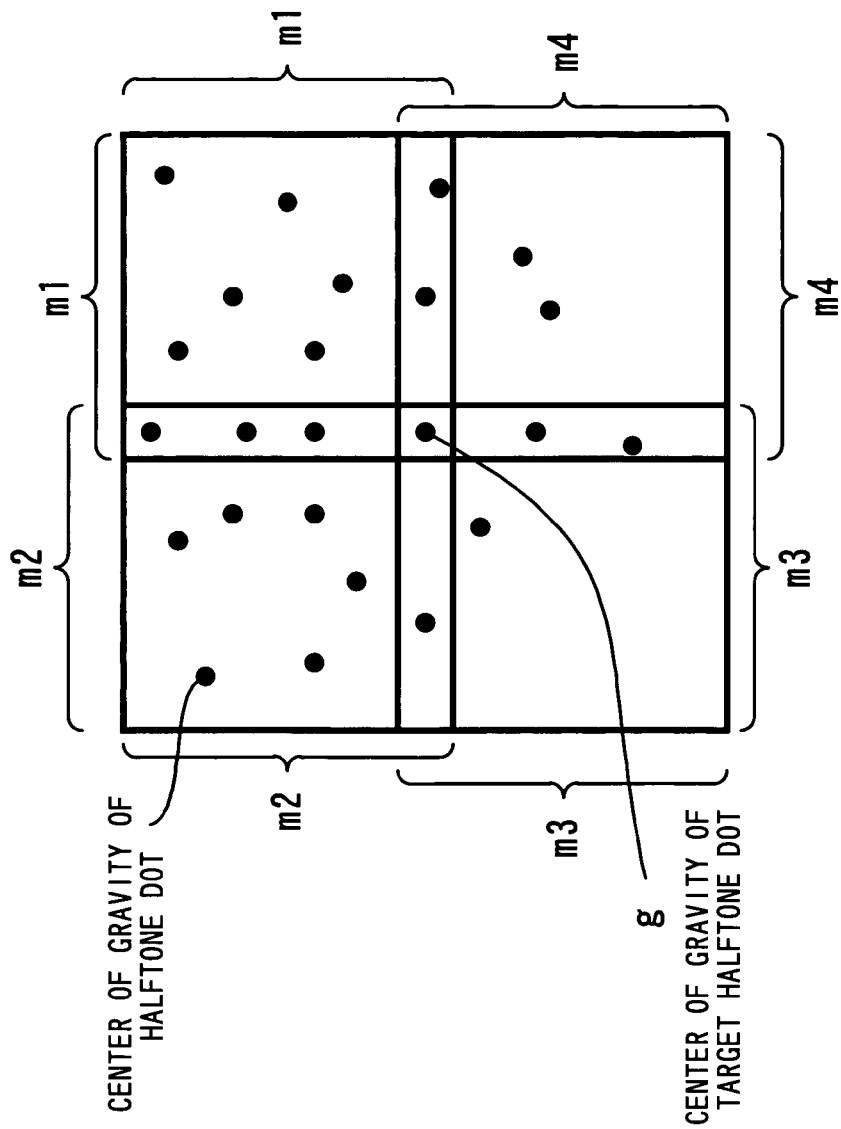
FIG. 2 is a diagram that describes elimination of an erroneously recognized halftone dot.

FIG. 2 is a diagram that illustrates how an erroneously recognized halftone dot is eliminated. First, the coordinates of each center of gravity are plotted in a plot area that is ensured in advance. Black dots in FIG. 2 denote the centers of gravity. Then, it is determined, for each center of gravity plotted in the area, whether the corresponding halftone dot is the original halftone dot or an erroneous halftone dot resulting from erroneous recognition of noise or dust on the image.

In FIG. 2, the center of gravity of the target halftone dot is assigned a symbol "g". Masks m1 through m4, which define search areas, are arranged so as to include the center "g" of gravity of the target halftone dot. Then, the number of the centers of gravity of the halftone dotes in each of the masks m1–m4 is counted. In other words, a halftone dot density in each of the masks m1–m4 is calculated.

If the number of the centers of gravity of the halftone dots obtained per mask is equal to or smaller than a given threshold value (in other words, if the halftone dot density does not meet a predetermined condition), the halftone dots in the corresponding mask are considered as those of noise or dust on the image resulting from erroneous recognition. Then, the information about the erroneously recognized halftone dots is deleted from the list. Further, the centers of gravity of the erroneously recognized halftone dots are deleted from the plot area.

Figure 3:
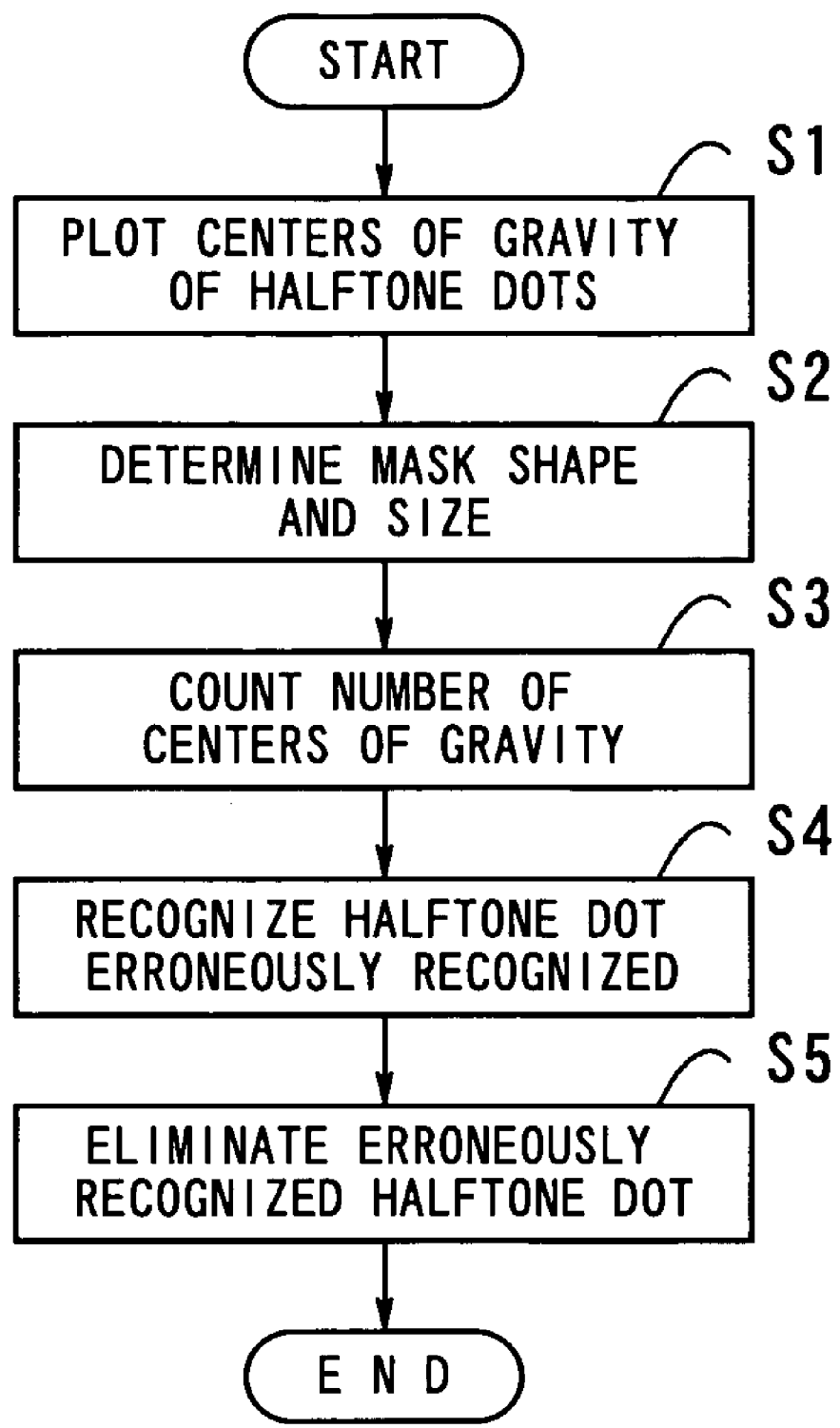
FIG. 3 is a flowchart of a process of eliminating an erroneously recognized halftone dot.

FIG. 3 is a flowchart of a process of eliminating erroneously recognized halftone dots.

[S1] The centers of gravity of the recognized halftone dots are plotted in the plot area that is ensured in advance.

[S2] One of the centers of gravity of the halftone dots plotted is selected as the center "g" of gravity of the target halftone dot. The shape and size of the masks that serve as the search areas are determined on the basis of the input resolution. This is because the intervals and orientations of halftone dots depend on the input resolution.

[S3] The masks are arranged so as to include the center "g" of gravity of the target halftone dot, and the number of the centers of gravity of the halftone dots is counted for each of the masks.

[S4] If the number of the centers of gravity of the halftone dots is equal to or smaller than the threshold value, it is determined that there is a high possibility that noise or dust on the image may be erroneously recognized as halftone dots.

[S5] The information about the centers of gravity of erroneously recognized halftone dots is eliminated from the list and the plot area. Then, similarly, another one of the centers of gravity of the halftone dots is selected as the center "g" of gravity of the target halftone dot, and the sequence starting with step S2 is repeated in order to eliminate all erroneously recognized halftone dots.

As described above, the halftone dot image map creating unit 12 can efficiently and effectively detect erroneously recognized halftone dots due to noise or dust.

A variation of the way to eliminate erroneously recognized halftone dots is described below with reference to FIG. 4, which is a diagram that illustrates this variation.

First, an input image area 120 is divided into blocks, in which the coordinates of the centers of gravity of halftone dots described in the lists are plotted. Next, it is determined, for each block, whether the block includes an erroneously recognized halftone dot. The size of the blocks is determined taking the input resolution into account.

Figure 4:
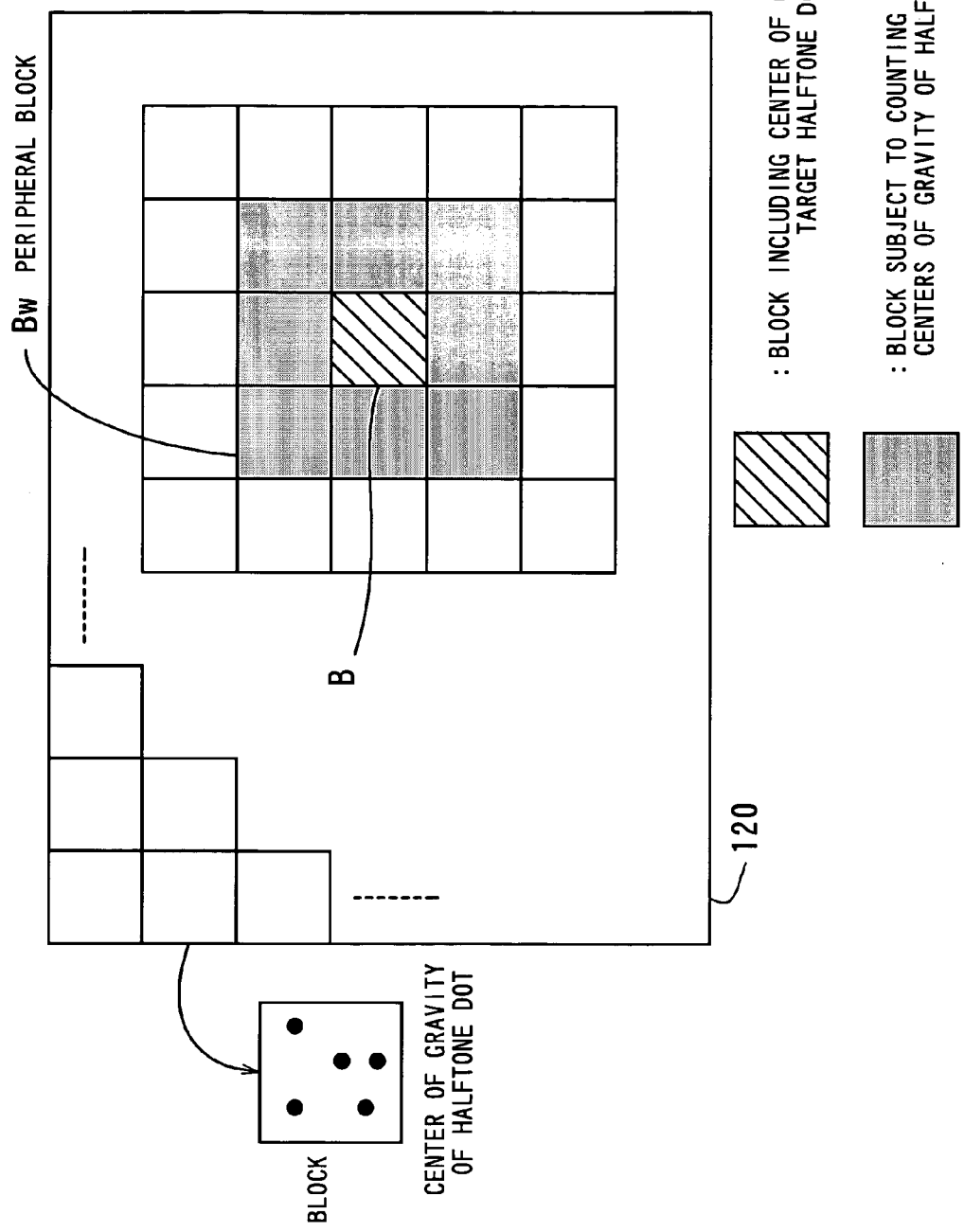
FIG. 4 is a diagram of a variation of the process for eliminating an erroneously recognized halftone dot.

FIG. 4 shows a block B that includes the center of gravity of the target halftone dot. The number of the centers of gravity of halftone dots in peripheral blocks Bw adjacent to the block B is counted.

If the number of the centers of gravity of halftone dots in the peripheral blocks Bw is equal to or smaller than a given threshold value, the halftone dots having the centers of gravity located in the block B are considered as those resulting from erroneous recognition of noise or dust in the image. Then, the information concerning all the halftone dots included in the block B, which is substantially considered as an erroneously recognized block, is eliminated. Further, the corresponding plots indicative of the centers of gravity are eliminated from the plot area.

As described above, the centers of gravity of halftone dots are grouped into blocks of a predetermined size, and the process of determining whether each block includes an erroneously recognized halftone dot is performed. It is to be noted that this variation employs the block-based process, not the dot-based process. Thus, it is possible to handle a large number of halftone dots at a time and execute the process at higher speed.

Figure 5:
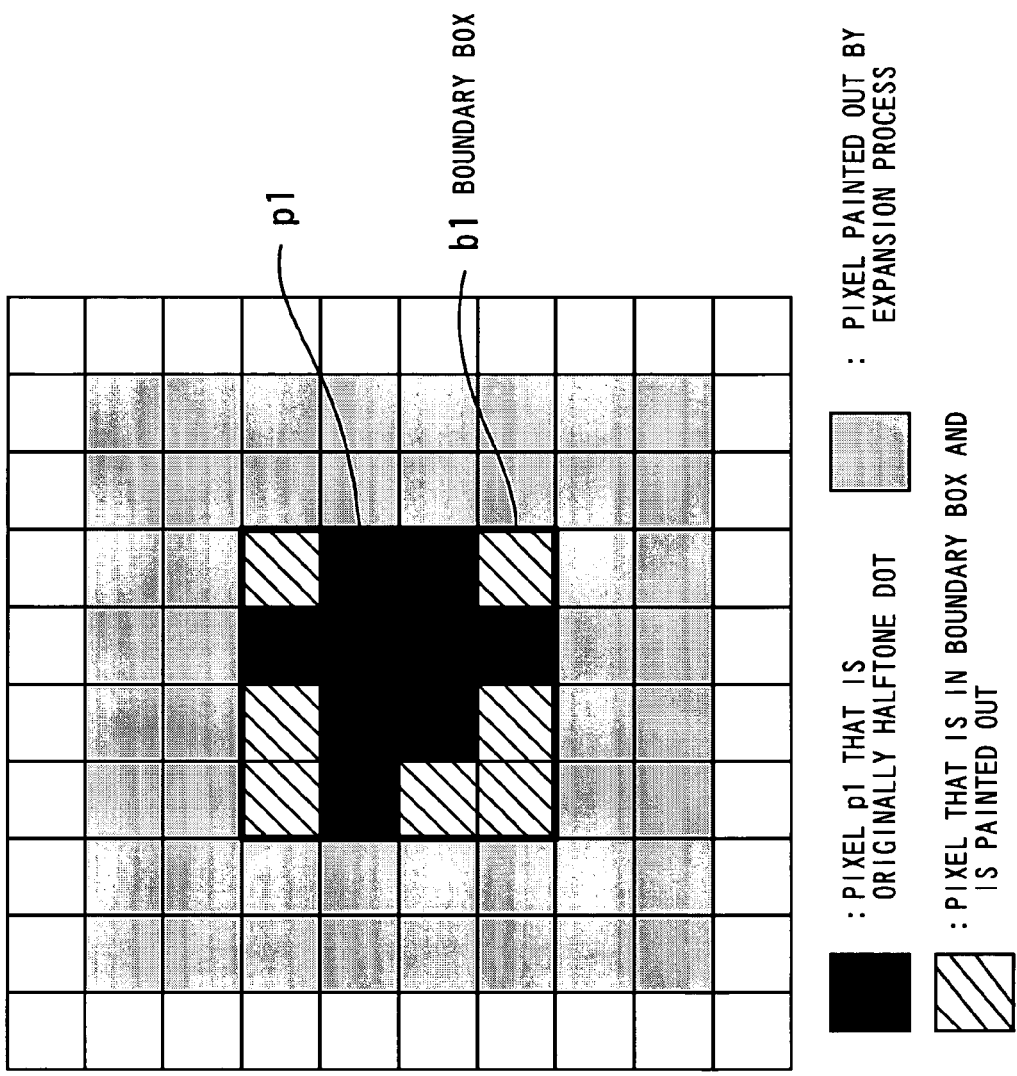
FIG. 5 is a diagram that illustrates a painting-out process.

A description will now be given of a process of creating the halftone dot image area map Ma. FIG. 5 is a diagram that illustrates a painting-out process. The halftone dot image area map creating unit 12 paints out a boundary box and portions expanding from the boundary box on the basis of the boundary box information. Hereinafter, the process of painting out portions expanding from the boundary box is referred to as an expansion process.

First, with respect to pixel p1 that is originally a halftone dot, an area of boundary box b1 is painted out in accordance with boundary box information described in the list from which the erroneously recognized halftone dots have been eliminated. Further, the expansion process for the boundary box is executed. The range of expansion from the boundary box is determined on the basis of the input resolution.

The above painting-out process is intended to recognize, as an area, the position of the halftone dot image in the input document. The process of painting out the boundary box and the expansion process are performed with regard to all the coordinates of the centers of gravity of halftone dots described in the list from which erroneously recognized halftone dots have been eliminated.

Figure 6:
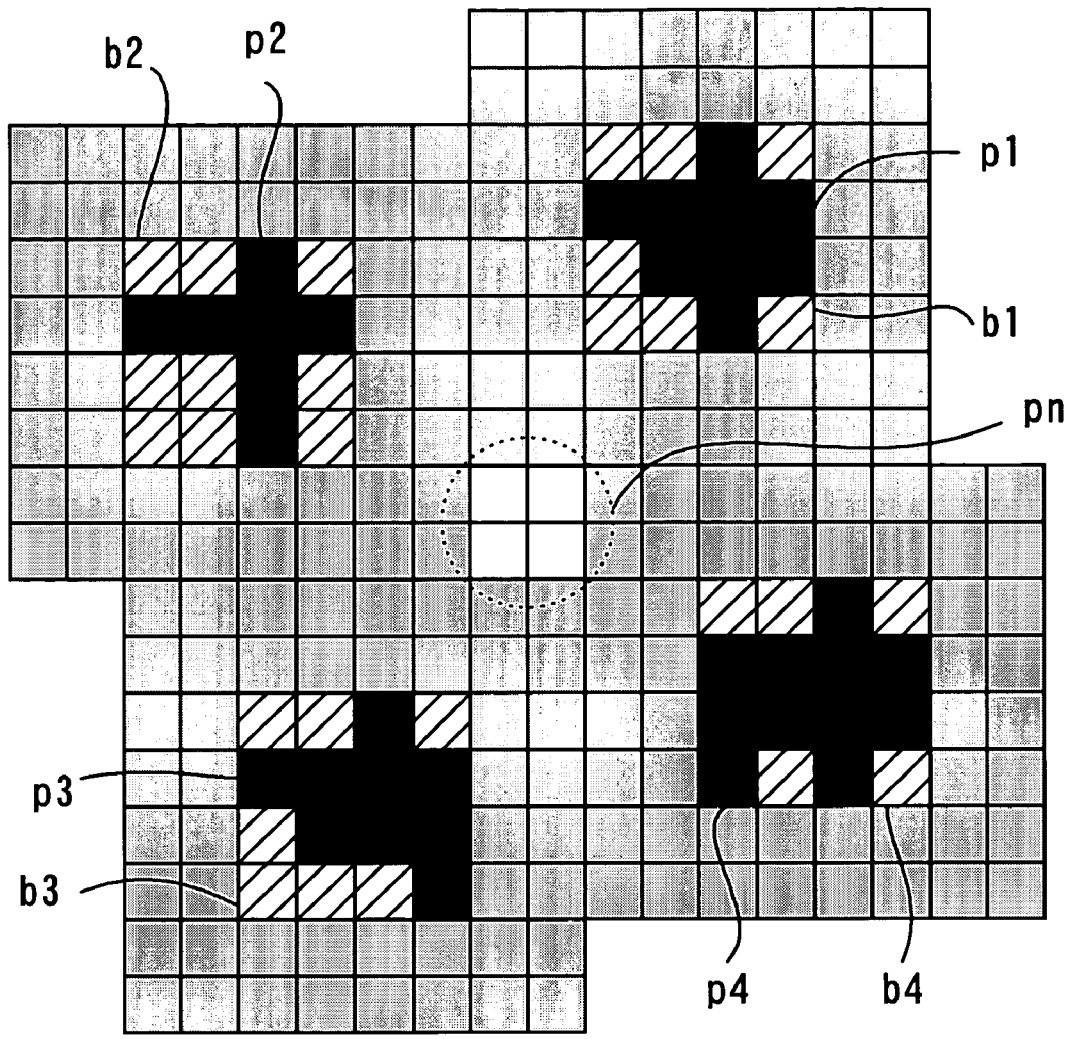
FIG. 6 is a diagram that shows gap noise pixels.

FIG. 6 illustrates a gap noise pixel. More particularly, FIG. 6 is a diagram that illustrates a situation observed after boundary boxes b1–b4 for pixels p1–p4 that are originally halftone dots are subject to the painting-out process and the expansion process. It will be seen from FIG. 6 that a gap noise (gap pixels pn) may occur.

Thus, it is necessary to determine whether the gap pixels pn are gap noise pixels to be painted out to form part of the halftone dot area.

Figure 7:
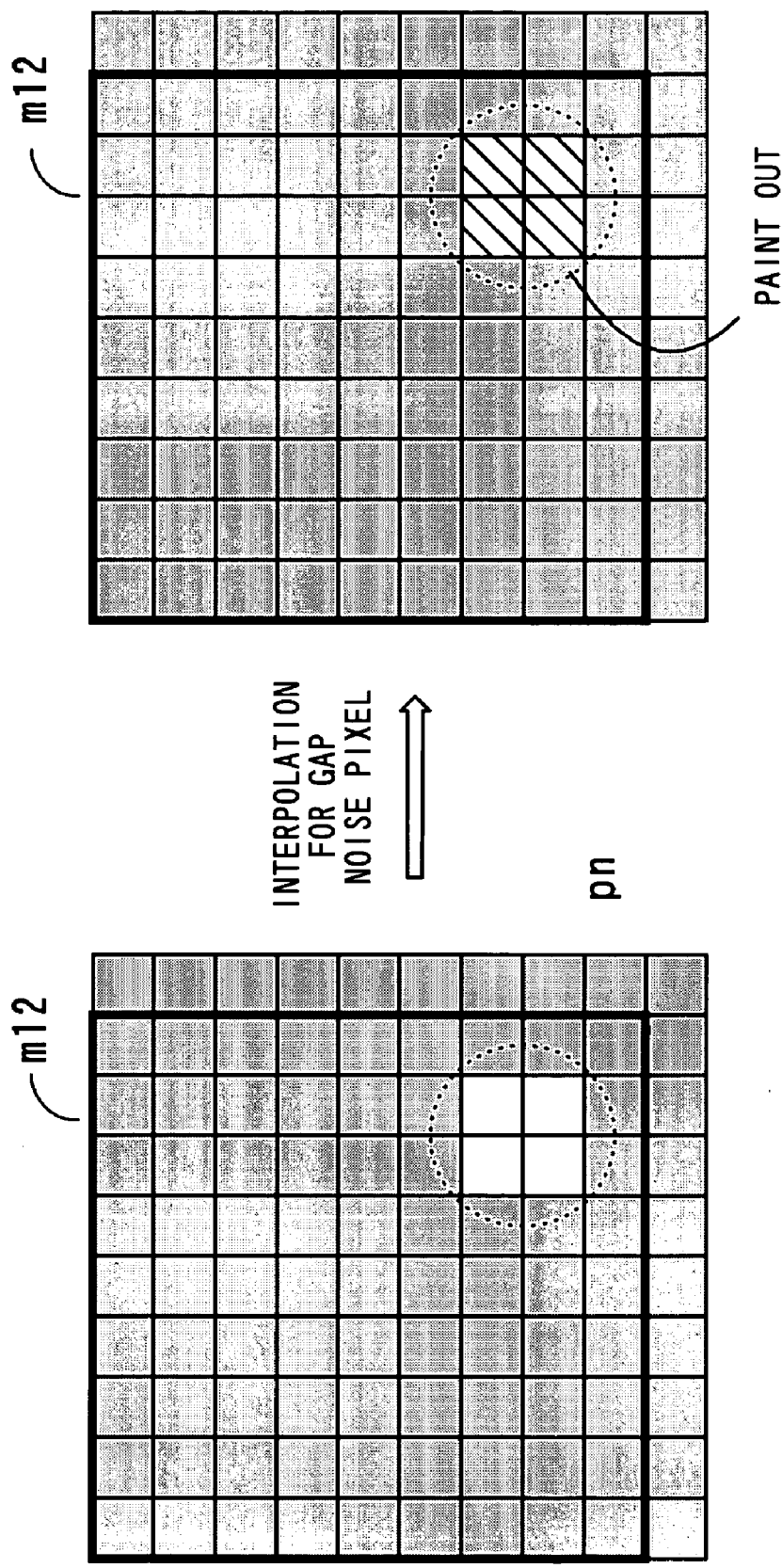
FIG. 7 is a diagram that illustrates an interpolation process for gap noise pixels.

FIG. 7 is a diagram that illustrates an interpolation process for the gap noise pixels. White frames in an area shown in FIG. 7 are gap pixels pn. A mask m12 that includes the gap pixels pn is set to the area. The mask m12 is depicted by a thick solid line shown in FIG. 7. The mask m12 has a size that is determined on the basis of the input resolution.

If the number of gap pixels pn in the mask m12 is equal to or smaller than a given threshold value, the gap pixels pn are considered as gap pixel noise and are thus painted out.

As described above, the halftone dot image area map creating unit 12 performs the painting-out process for the boundary box area, the expansion process and the interpolation process for the gap noise pixels by using the list from which the erroneously recognized halftone dots have been eliminated. In this manner, the halftone dot image area map Ma is created.

The line drawing/character area map creating unit 13 is described. This unit 13 detects a white area and a black area that can easily be recognized from the multi-valued input image, and recognizes these areas as closed areas.

Areas other than the halftone dot image area map Ma created by the halftone dot image area map creating unit 12 and the closed areas are considered as the line drawing/character area map Mb.

Figure 8:
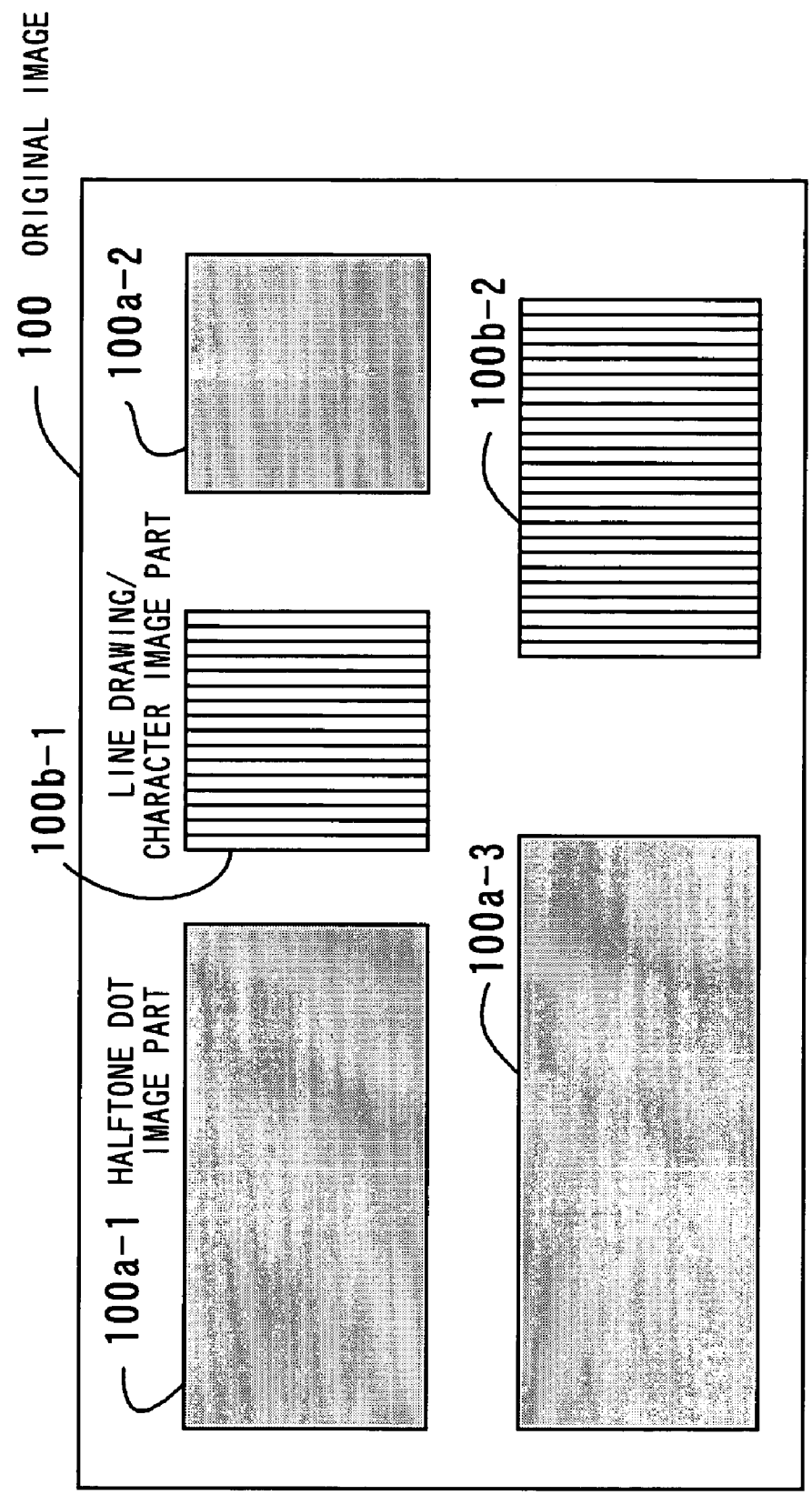
FIG. 8 is a diagram of an original image that includes a halftone dot image part and a line drawing/character part.
Figure 9:
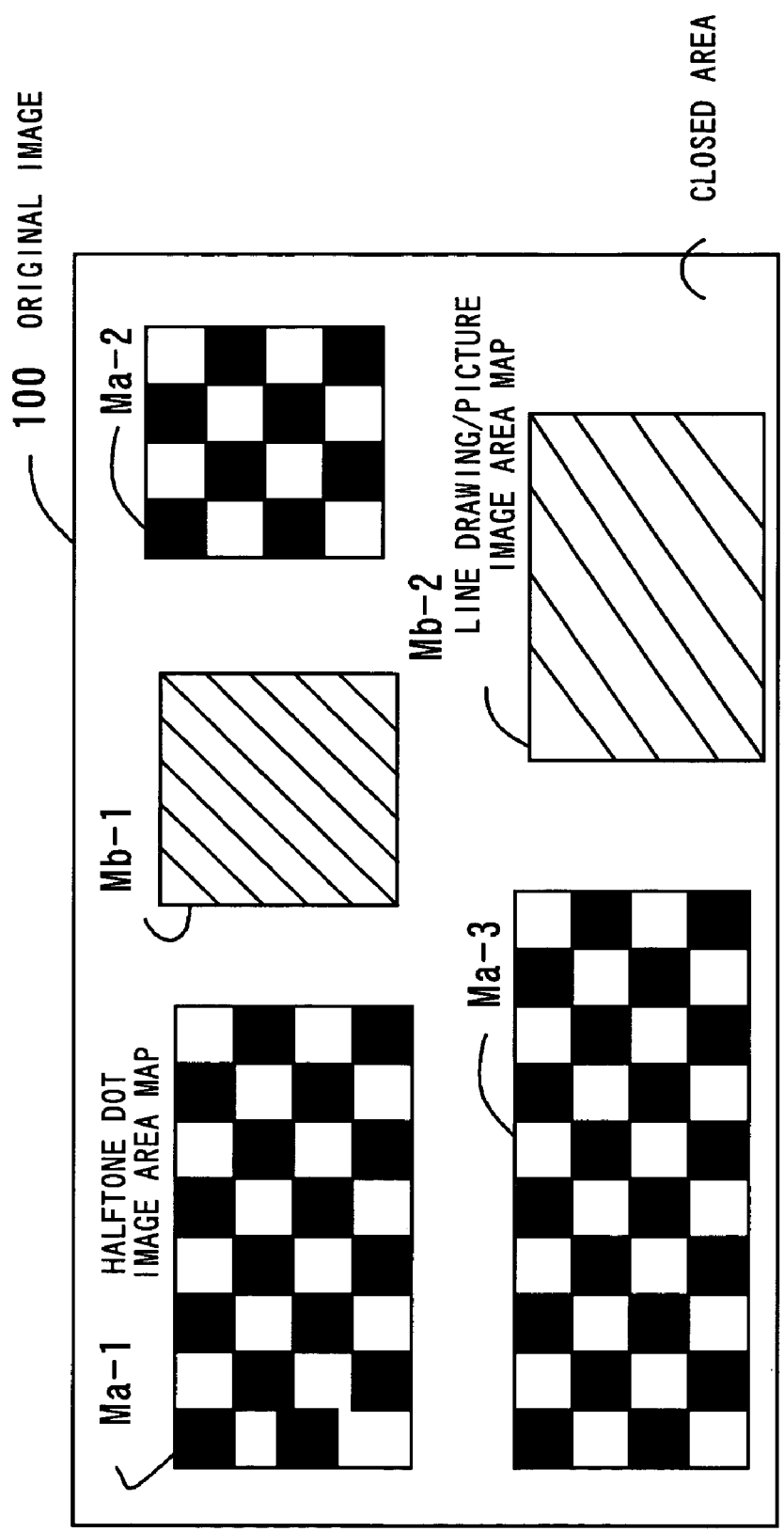
FIG. 9 is a diagram that illustrates a halftone dot image area map and a line drawing/character area map related to the original image shown in FIG. 8.

FIG. 8 is a diagram illustrating an original image having a halftone dot image part and a line drawing/character part. FIG. 9 is a diagram illustrating a halftone dot image area map and a line drawing/character area map, which maps are creased with regard to the original image shown in FIG. 8.

A multi-valued original image 100 includes halftone dot image parts 100a-1 through 100a-3 and line drawing/character parts 100b-1 and 100b-2, which areas are arranged in FIG. 8. With respect to the original image 100, the halftone dot image area map creating unit 12 and the line drawing/character part area map creating unit 13 respectively create halftone dot image area maps Ma-1 through Ma-3 and line drawing/character area maps Mb-1 and Mb-2, as shown in FIG. 9.

Next, the halftone dot image binarizing unit 14 is described. This unit 14 suppresses input read error and binarizes the input image corresponding to the halftone dot image area map Ma, so that a binarized halftone dot image can be generated.

First, the halftone dot image binarizing unit 14 sets an area in the proximity of the target pixel that is to be binarized and is included in the input image corresponding to the halftone dot image area map Ma. Hereinafter, an area that is set in the proximity of the target pixel is referred to as a proximity area. Then a threshold value that is valid only in the proximity area is adaptively determined on the basis of distribution of pixel values in the proximity area.

Figure 10:
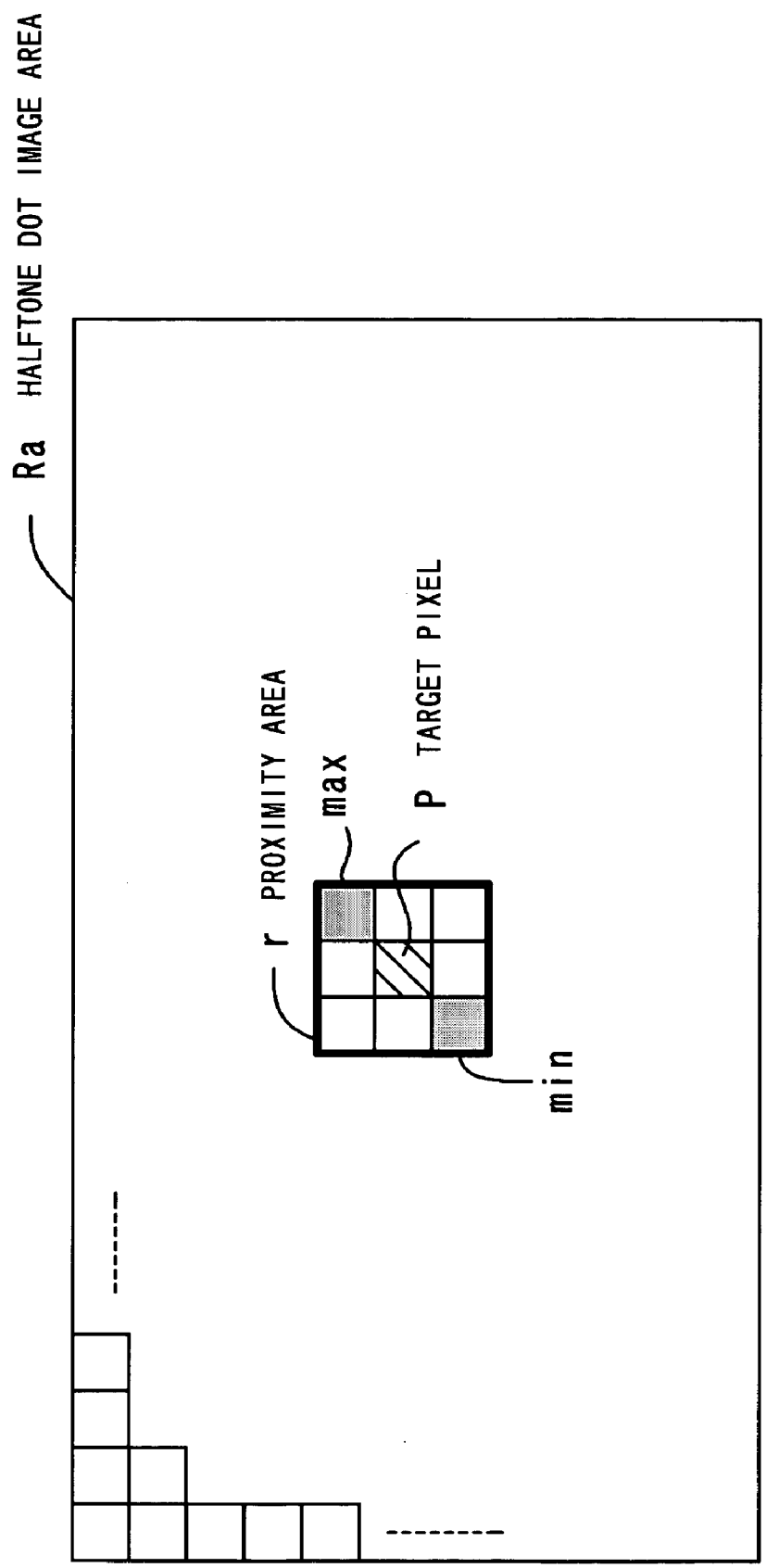
FIG. 10 is a diagram illustrating a target pixel and a proximity area.

FIG. 10 is a diagram that illustrates a target pixel and a corresponding proximity area. A target pixel P to be binarized and an associated proximity area r are set in a halftone dot image area Ra corresponding to the halftone dot image area map Ma. The size of the proximity area r is determined on the basis of the input resolution.

Then, a minimum value min and a maximum value max of pixels in the proximity area r are obtained, and a threshold value for binarization is determined therefrom. For example, the threshold value may be equal to (min+max)/2.

The threshold value thus determined does not have less influence of the input read error, and the quality of binarized image can be improved. The threshold value may be determined at some intervals of pixels rather than for each of all the target pixels.

In a later process, the halftone dot image binarizing unit 14 does not merely compare the value of the target pixel P with the above-mentioned threshold value but changes the value of the target pixel P so as to have an optimum value. Then, the optimum value of the target pixel P is compared with the threshold value for binarization of the target pixel P.

The reason for the use of the optimum value thus changed is as follows. The value of the halftone dot pixel in the halftone dot image area, that is, the value of the target pixel P may include input read error as has been described with reference to FIG. 1. Even if the original value of the target pixel P were compared with the threshold value, the resultant binarized image would not have good quality. Thus, according to the present invention, the pixel value is changed so as to eliminate an erroneous component and is then compared with the threshold value for binarization.

The process of changing the value of the target pixel P commences performing a priority decision process, which determines whether the value of the target pixel P should be increased or decreased by referring to the proximity area r of the target pixel P.

More particularly, the average value of the pixels in the proximity area r that surrounds the target pixel P is calculated. If the average value is larger than a predetermined threshold value, the target pixel P is changed so as to have an increased value (toward white). In contrast, if the average value is smaller than the predetermined threshold value, the target pixel P is changed so as to have a decreased value (toward black).

The proximity area r may be considered as being full of pixels having small or large values, provided that the smallest value of the pixels in the proximity area r around the target pixel P is small beyond a given extent (for example, the smallest pixel value is very close to zero) or the largest value of the pixels therein is large beyond a given extent (for example, the largest pixel value is very close to 255). This is because the human eyes do not have an ability of recognizing the tone of each halftone dot in the proximity area r.

If the pixel values have an inclination as described above, the value of the target pixel P is not changed but is compared with the already obtained threshold value in order to attempt to accelerate the binarization process. In other words, the value of the target pixel P is compared with the threshold value in the absence of change of the pixel value.

Figure 11:
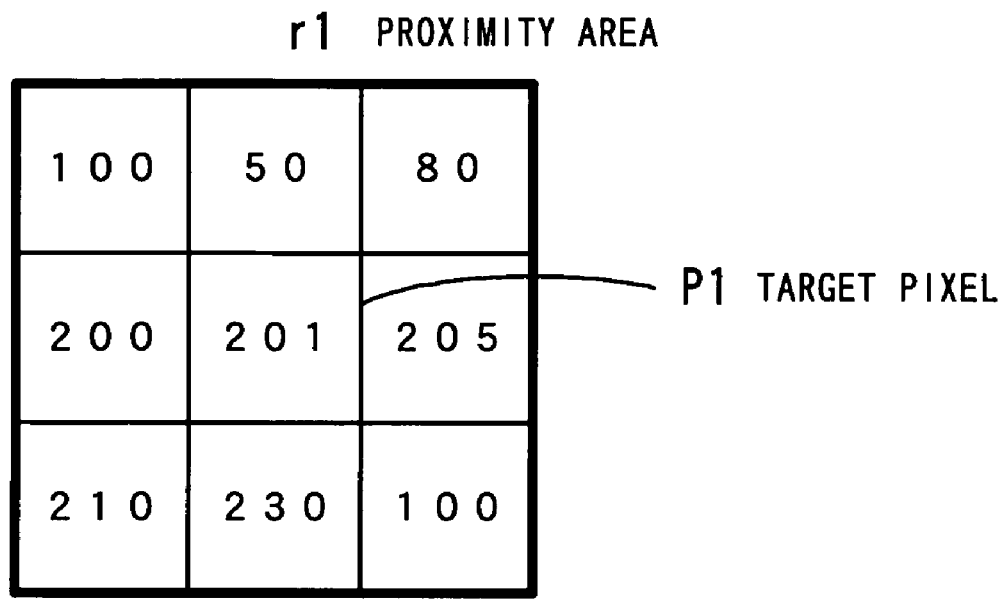
FIG. 11 is a diagram illustrating a process of changing the value of the target pixel.
Figure 12:
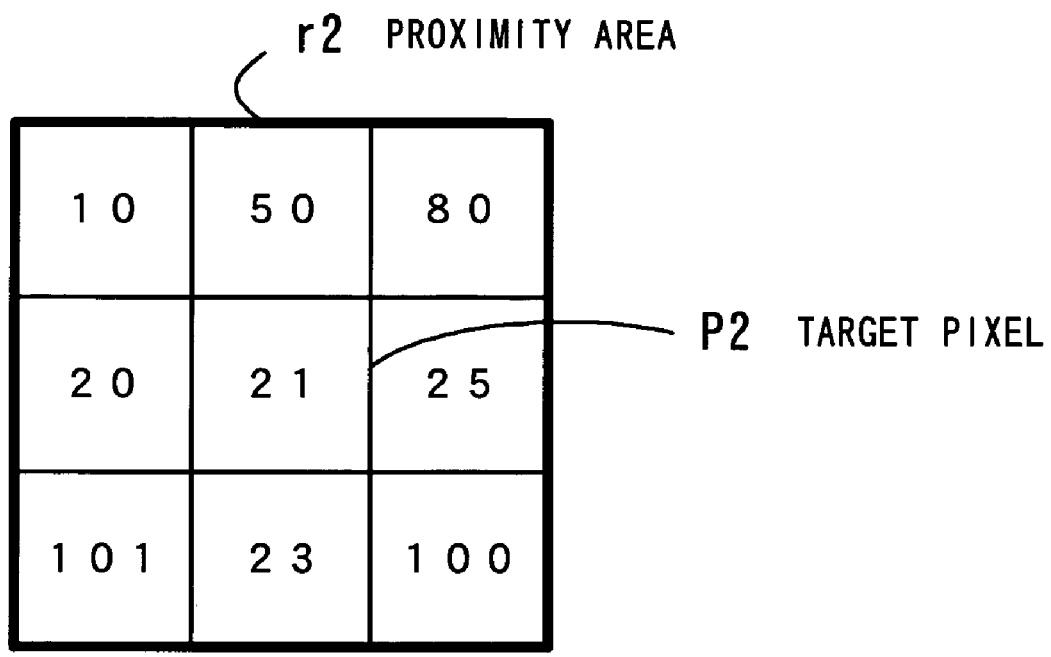
FIG. 12 is anther diagram illustrating the process of changing the value of the target pixel.

The process of changing the value of the target pixel P will now be described with reference to FIGS. 11 and 12. FIG. 11 illustrates a changing process that should be executed when it is determined that the value of the target pixel P should be increased. FIG. 12 illustrates another changing process that should be executed when it is determined that the value of the target pixel P should be decreased.

Referring to FIG. 11, the value of a target pixel P1 surrounded by a proximity area r1 is changed by expression (1) when it is determined that the value of the target pixel P1 should be increased:

$$Pa = \text{(the maximum pixel value in the proximity area)} * \alpha \quad (1)$$

where Pa is the changed pixel value and $\alpha$ satisfies $0 < \alpha \leq 1.0$. In the example shown in FIG. 11, the maximum pixel value in the proximity area is 230. The target pixel P1 is binarized by comparing the changed pixel value Pa obtained by expression (1) with the threshold value.

Referring to FIG. 12, the value of a target pixel P2 surrounded by a proximity area r2 is changed by expression (2) when it is determined that the value of the target pixel P2 should be decreased:

$$Pb = \text{(the minimum pixel value in the proximity area)} * \beta \quad (2)$$

where Pb is the changed pixel value and $\beta$ satisfies $1.0 \leq \beta$. In the example shown in FIG. 12, the minimum pixel value in the proximity area is 10. The target pixel P2 is binarized by comparing the changed pixel value Pb obtained by expression (2) with the threshold value.

If the difference between the changed pixel value obtained by expression (1) or (2) and the original pixel value becomes larger than a predetermined threshold value, the changed pixel value may be restrained in terms of the following.

If a target pixel of a black pixel is surrounded by a proximity area r of all white, the target pixel will be changed to have a much larger value because the proximity area r has a very high average pixel value. This may change the black dot to white.

Therefore, if there is a remarkable difference between the original value of the target pixel and its changed value, a restraint is imposed on the changed pixel value. In the above-mentioned example, the black pixel is inhibited from having an increased pixel value. The difference can be described as follows:

$$\text{Difference} = |\text{(pixel value after changing)} - \text{(pixel value before changing)}| \quad (3)$$

where |A| denotes the absolute value of A.

Figure 13:
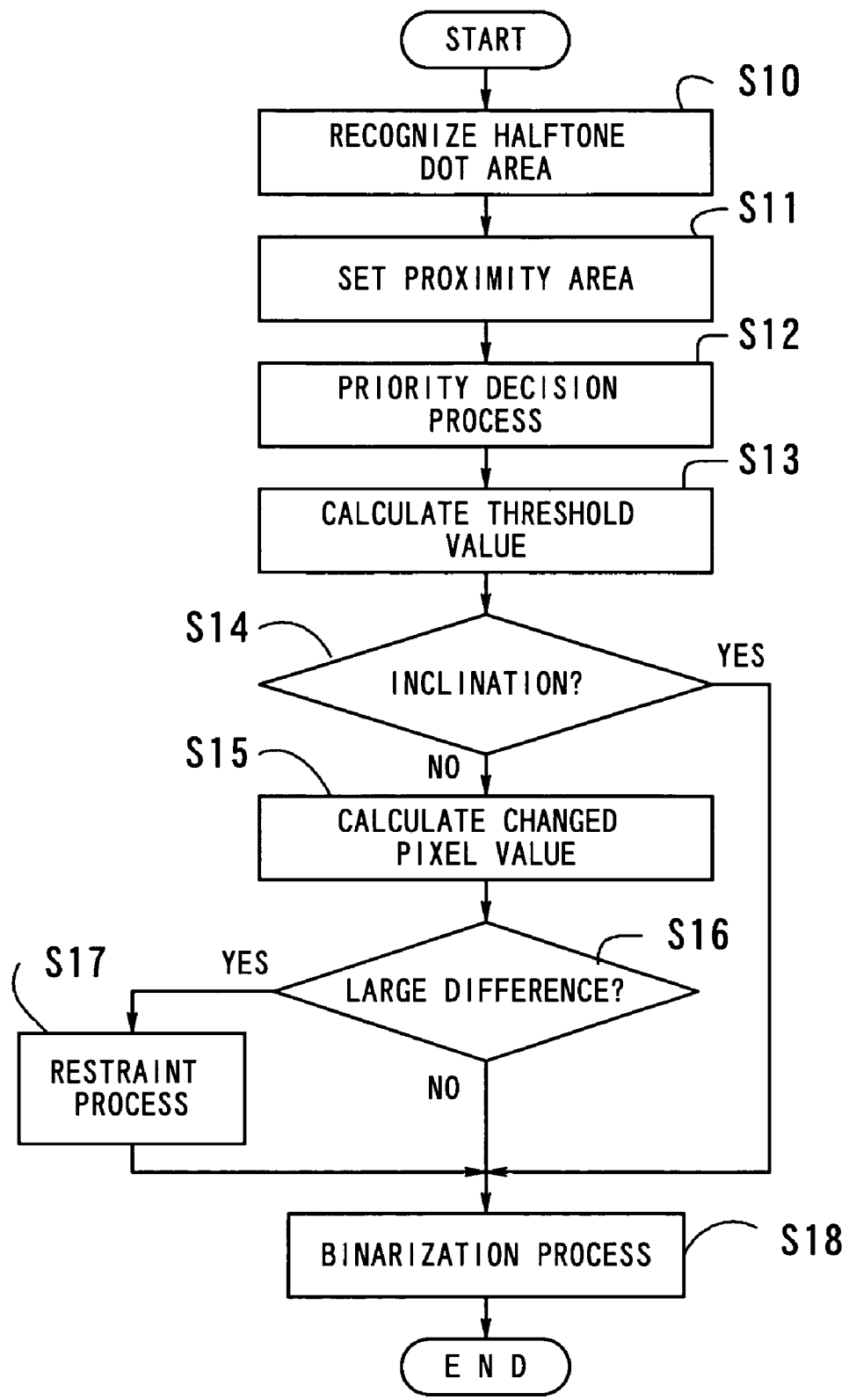
FIG. 13 is a flowchart of a binarization process.

A description will now be given, with reference to FIG. 13, of a process flow of binarization performed by the halftone dot image binarizing unit 14. FIG. 13 is a flowchart of the binarization process.

[S10] The halftone dot image area in the multi-valued image is recognized by using the halftone dot image area map Ma.

[S11] The proximity area r is set to the target pixel to be binarized in the halftone dot image area.

[S12] The average value of the pixels in the proximity area r is obtained, and priority decision is made as to whether the value of the target pixel should be increased or decreased.

[S13] The threshold is computed from the maximum pixel value and the minimum pixel value available in the proximity area r.

[S14] It is determined whether there is an inclination in regard of the pixel values in the proximity area r.

[S15] The changed value of the target pixel is calculated on the basis of the priority decision made in step S12.

[S16] The difference between the pixel value before changing and the pixel value after changing is calculated. If the difference is greater than the predetermined threshold value, the process proceeds to step S17. Otherwise, the process proceeds to step S18.

[S17] The restraint is imposed on the changed pixel value.

[S18] The changed pixel value is compared with the threshold value obtained in step S13 for binarization. Then, all the remaining pixels are processed one by one as described above, so that a binarized high-quality halftone dot image can be generated.

As described above, the halftone dot image binarizing unit 14 binarizes the halftone dot image while suppressing input read error. This realizes binarization processing in which the shapes of halftone dots can be maintained and occurrence of Moiré can be suppressed.

Next, a description will be given of the line drawing/character smoothing unit 15. This unit 15 performs a jaggy smoothing process of smoothing a jaggy of the target pixels in the input image corresponding to the line drawing/character area map Mb, so that a binarized line drawing/character having a smoothed contour can be generated.

Figure 14:
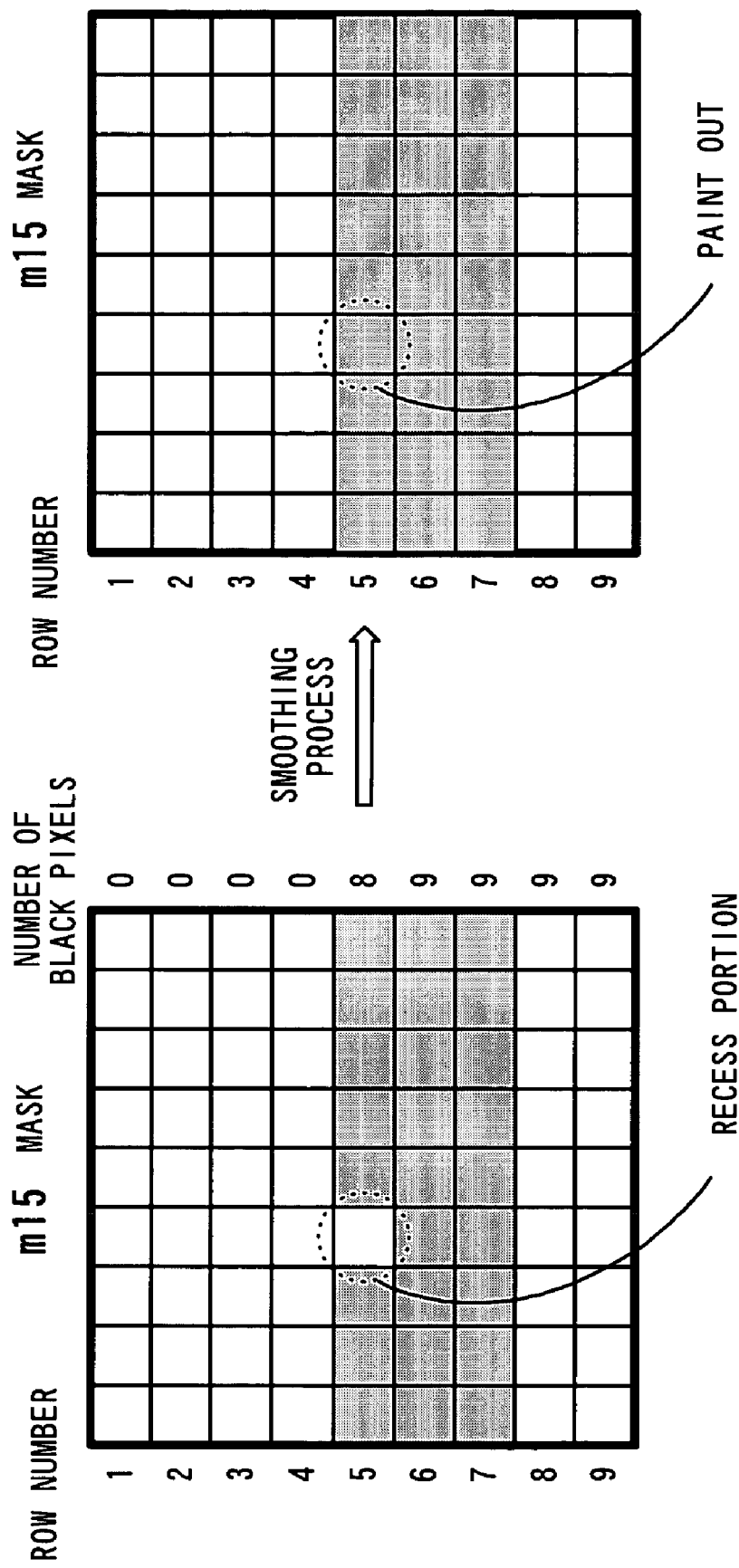
FIG. 14 is a diagram that illustrates a jaggy smoothing process.

FIG. 14 is a diagram that illustrates the jaggy smoothing process. The shape and size of a mask m15 is determined taking the input resolution into consideration. Then, the mask m15 is set to a line drawing/character area.

Next, the number of black pixels in each row or column within the mask m15 is counted. Then, the ratios of the numbers of black pixels between different rows or columns are calculated. Thereafter, it is determined whether there is a jaggy in the vertical or lateral direction by referring to the ratios. If a jaggy is detected, it is smoothed so that the jaggy can be reshaped into a smoothed contour. Then, the binarization process is executed, so that a binarized drawing/character image with a smoothed contour can be generated.

Before smoothing, rows numbered 1–4 and rows numbered 8 and 9 in the mask m15 do not have any black pixel at all. Row number 5 has eight black pixels, and rows numbered 6 and 7 have nine black pixels. Thus, it can be concluded that the row number 5 has a jaggy. Such a jaggy is painted out in smoothing, and is reshaped into a smoothed contour. The above process is repeated while shifting the mask m15 on the pixel basis.

Figure 15:
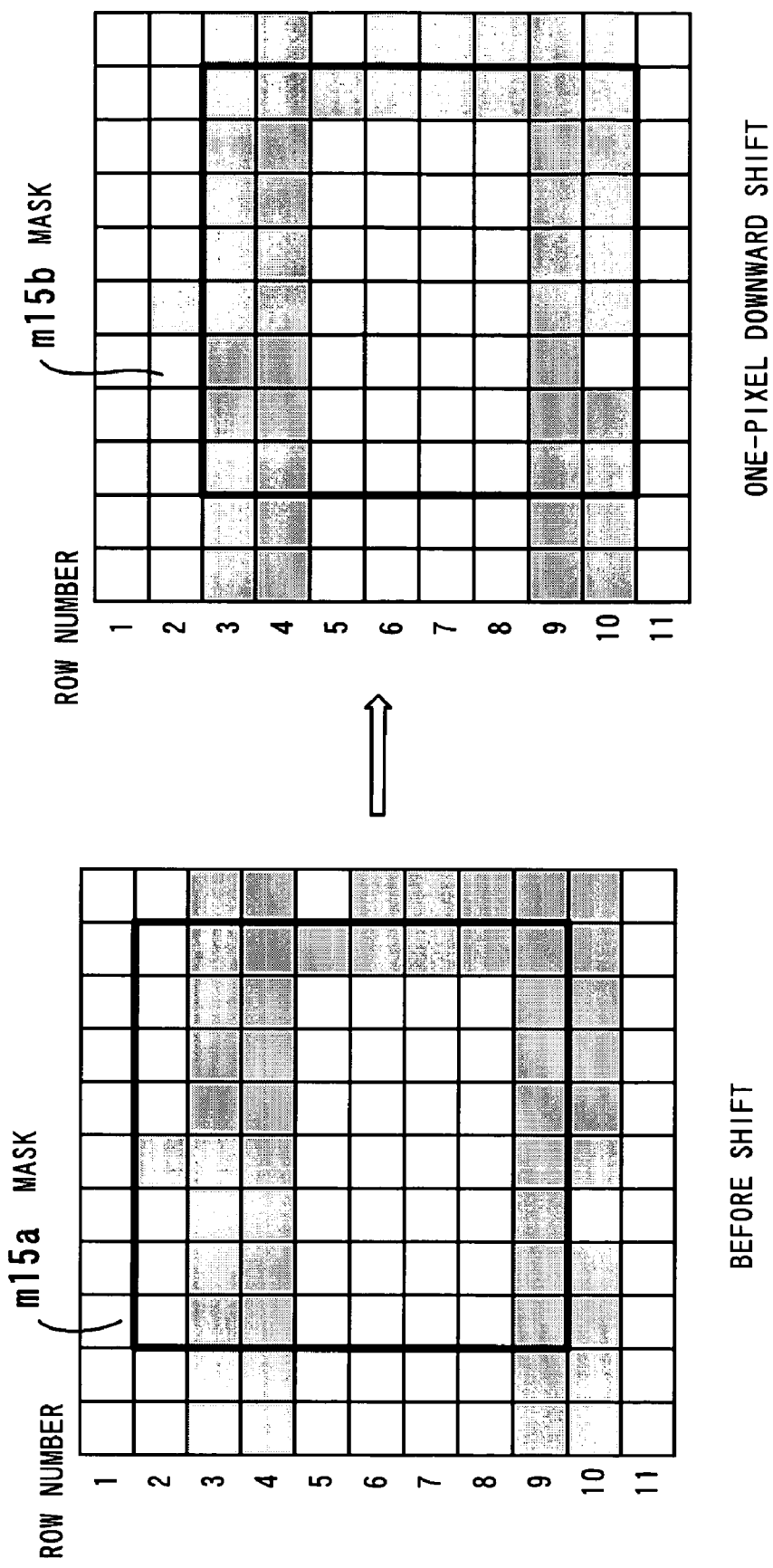
FIG. 15 is a diagram that illustrates a variation of the jaggy smoothing process.

A variation of the jaggy smoothing process is described below. FIG. 15 is a diagram that illustrates a variation of the jaggy smoothing process. In FIG. 14, the number of black pixels in each row or column within the mask is counted each time the mask is shifted on the pixel basis.

In the variation, the number of black pixels in each row or column within the mask is counted and stored. Then, the mask is shifted so as to include a new row or column. Then, the number of black pixels only in the new row or column is counted. Thereafter, the ratios of the numbers of black pixels between different rows or columns are calculated using the stored numbers of black pixels and the newly obtained number of black pixels in the new row or column. Then, a rough contour is detected by using the ratios and is then smoothed.

Assuming that a mask m15a is located as shown in FIG. 15. In this case, the numbers of black pixels in row numbers 2 through 9 are respectively counted and stored. Then, the mask m15a is shifted downwards by one pixel. In FIG. 15, the shifted mask is assigned a new reference m15b. The mask m15b includes row numbers 3 through 10. The number of black pixels contained in each of row numbers 3 through 9 in the mask m15b has been counted and stored. Thus, only the number of black pixels in the new row numbered 10 is counted and stored.

Then, the ratios of black pixels are calculated by using the numbers of black pixels that have been stored and the number of black pixels newly counted within the mask m15b. Thus, the smoothing process can be speeded up.

The image combining unit 16 combines the binarized halftone dot image and the binarized line drawing/character image generated in the above-mentioned manners.

Figure 16:
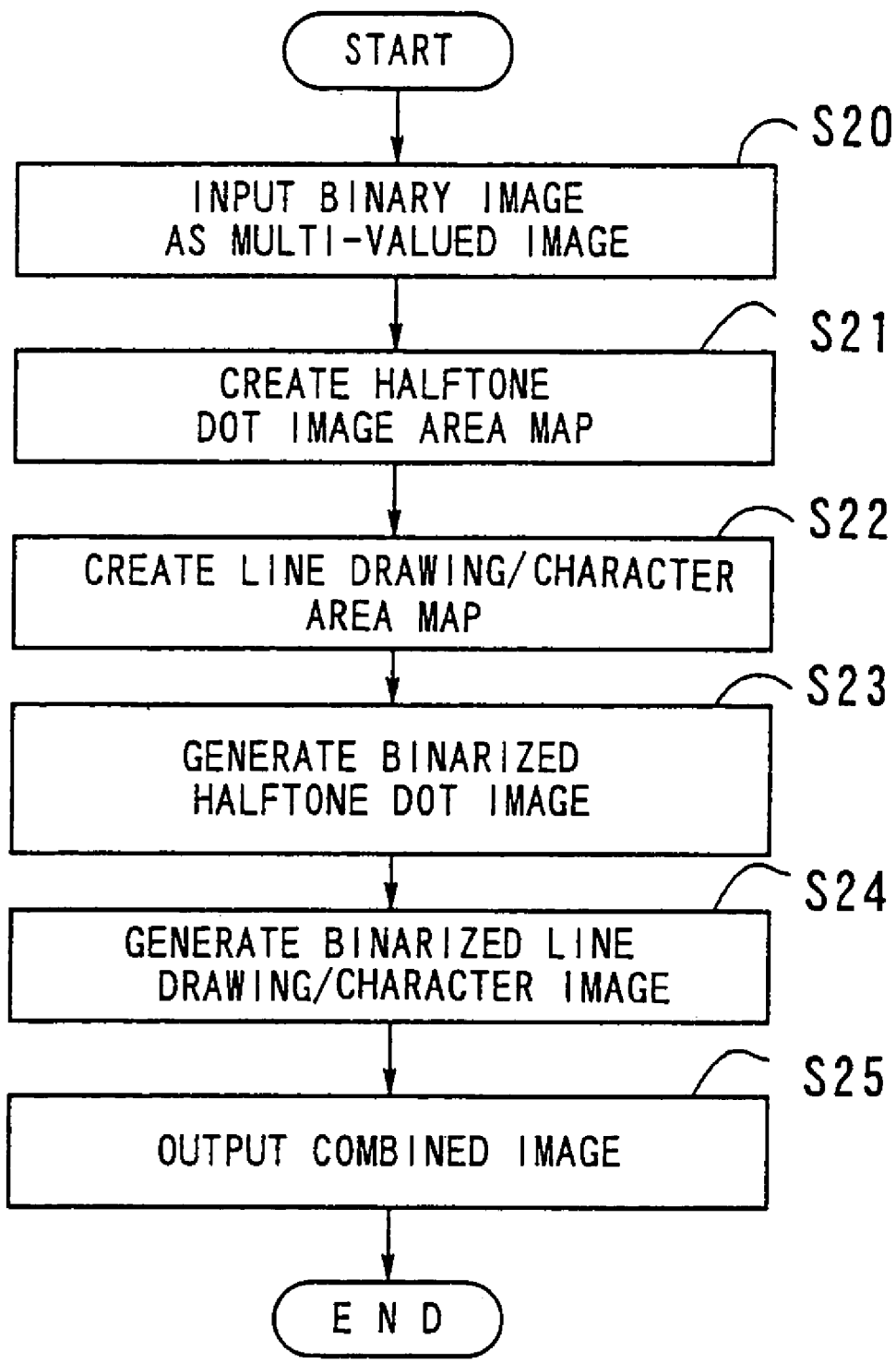
FIG. 16 is a flowchart of an image processing method of the present invention.

A description will be given of an image processing method of the present invention with reference to FIG. 16, which is a flowchart of the image processing method of the present invention.

[S20] A binary image is input as a multi-valued image.

[S21] A halftone dot image area that may be in the multi-valued image is searched for, and the corresponding halftone dot image area map is created.

[S22] A line drawing/character image area that may be in the multi-valued image is searched for, and the corresponding line drawing/character area map is created.

[S23] An input image corresponding to the halftone dot image area map is binarized, so that a binarized halftone dot image can be generated while input read error caused at the time of inputting the binary image is suppressed.

[S24] A jaggy that may be contained in an input image corresponding to the line drawing/character area map is smoothed, so that a binarized line drawing/character image can be generated.

[S25] The binarized halftone dot image and the binarized line drawing/character image are combined, and a combined binarized image is output.

The image processing apparatus 10 and the image processing method of the present invention is outlined as follows. A binary image in input as a multi-valued image. Then, the halftone dot image area map Ma and the line drawing/character image area map Mb are created. An input image corresponding to the halftone dot image area map Ma is binarized while input read error is suppressed. An input image corresponding to the line drawing/character image map Mb is smoothed to eliminate jaggy noise. Then, a binarized halftone dot image and a binarized line drawing/character image are finally combined.

Thus, the halftone dot image part and the line drawing/character part in the input image are definitely separated from each other and are subject to respective, most suitable image processing. Therefore, it becomes possible to efficiently and effectively eliminate Moiré from the halftone dot image part and jaggy noise from the line drawing/character part and to generate high-quality binary image.

The image processing apparatus of the present invention includes means for inputting a binary image as a multi-valued image, means for searching for a halftone dot image area that may be in the multi-valued image and creating a halftone dot image area map, searching for a line drawing/character image area that may be in the multi-valued image and creating a line drawing/character image area map, means for binarizing an input image corresponding to the halftone dot image area map while suppressing input read error that may occur at the time of inputting the binary image and thus generating a binarized halftone dot image, means for smoothing a jaggy that may be contained in an input image corresponding to the line drawing/character area map and thus generating a binarized line drawing/character image, and means for combining the binarized halftone dot image and the binarized line drawing/character image. Thus, high-quality binary image can be generated.

Also, the present invention includes the image processing method that includes the steps of inputting a binary image as a multi-valued image, searching for a halftone dot image area that may be in the multi-valued image and creating a halftone dot image area map, searching for a line drawing/character image area that may be in the multi-valued image and creating a line drawing/character image area map, binarizing an input image corresponding to the halftone dot image area map while suppressing input read error that may occur at the time of inputting the binary image and thus generating a binarized halftone dot image, smoothing a jaggy that may be contained in an input image corresponding to the line drawing/character area map and thus generating a binarized line drawing/character image, and combining the binarized halftone dot image and the binarized line drawing/character image. Thus, high-quality binary image can be generated.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An image processing apparatus processing a binary image, comprising:
   an input unit that inputs the binary image as a multi-valued image;
   a halftone dot image area map creating unit controlling the image processing apparatus to search for a halftone dot image area in the multi-valued image according to a process, comprising:
   recognizing halftone dots in the multi-valued image,
   generating a list of halftone dot information comprising center-of-gravity information about centers of gravity of the halftone dots, as information about each recognized halftone dot,
   plotting the centers-of-gravity of the recognized halftone dots in a plot area ensured in advance,
   determining a shape and a size of masks to serve as search areas based upon an input resolution of the binary image,
   arranging the masks to include a center-of-gravity of a target halftone dot,
   counting a number of centers-of-gravity of the halftone dots for each of the arranged masks,
   determining a high possibility that noise and/or dust on the binary image may be erroneously recognized as halftone dots, if the number of the centers-of-gravity of the halftone dots is equal to or smaller than a threshold value,
   eliminating information about the centers-of-gravity of erroneously recognized halftone dots from the list and the plot area, and
   creating a halftone dot image area map according to the halftone dot information list from which the erroneously recognized halftone dot information has been eliminated;
   a line drawing/character area map creating unit that searches for a line drawing/character image area in the multi-valued image and creates a line drawing/character image area map;
   a halftone dot image binarizing unit that binarizes an input image corresponding to the halftone dot image area map created based upon the eliminating the erroneously recognized halftone dot, while suppressing input read errors occurred when said input unit inputs the binary image by optimizing a value of a target pixel to be binarized, and generates a binarized halftone dot image;
   a line drawing/character smoothing unit that smoothes a jaggy contained in an input image corresponding to the line drawing/character area map, and generates a binarized line drawing/character image; and
   an image combining unit that combines the binarized halftone dot image and the binarized line drawing/character image.

2. The image processing apparatus according to claim 1, wherein said halftone dot image area map creating unit calculates a halftone dot density in one of blocks that correspond to a given area by referring to the center-of-gravity information about halftone dots in said one of the blocks and deletes corresponding information from the halftone dot image area map when the halftone dot density does not meet a given condition.

3. The image processing apparatus according to claim 1, wherein the generated list further comprises boundary box information, as information about each halftone dot in the recognized halftone dot image area,
   wherein said creating the halftone dot image area map by the halftone dot image area map creating unit comprises performing a first process of painting out a boundary box and a second process of painting out a portion expanding from the boundary box on the basis of the boundary box information, for each of all the center-of-gravity information, to create the halftone dot image area map, and includes the boundary box and the portion that have been painted out in the binarized halftone dot image.

4. The image processing apparatus according to claim 3, wherein, when a gap pixel remains after the first and second processes are performed for each of all the center-of-gravity information, said halftone dot image area map creating unit paints out the gap pixel when a number of gap pixels is smaller than a predetermined threshold value.

5. The image processing apparatus according to claim 1, wherein said line drawing/character area map creating unit detects a closed area from the multi-valued image in order to create the line drawing/character area map, said closed area corresponding to the line drawing/character area.

6. The image processing apparatus according to claim 1, wherein said halftone dot image binarizing unit sets a proximity area close to a target pixel that is included in the input image corresponding to the halftone dot image area map and is to be binarized.

7. The image processing apparatus according to claim 6, wherein said halftone dot image binarizing unit adaptively determines a threshold value for binarization on the basis of a distribution of pixel values in the halftone dot image area.

8. The image processing apparatus according to claim 6, wherein said halftone dot image binarizing unit changes a value of the target pixel on the basis of the distribution, a changed value of the target pixel being used for binarization.

9. The image processing apparatus according to claim 8, wherein, when said halftone dot image binarizing unit detects an inclination in regard of pixel values on the basis of distribution thereof, the halftone dot image binarizing unit does not binarize the target pixel in the absence of change of the value thereof.

10. The image processing apparatus according to claim 8, wherein said halftone dot image binarizing unit determines whether the value of the target pixel should be increased or decreased on the basis of the distribution.

11. The image processing apparatus according to claim 10, wherein said halftone dot image binarizing unit calculates the changed value of the target pixel from a maximum pixel value available in the halftone dot image area when it is determined that the value of the target pixel should be increased, and calculates the changed value of the target pixel from a minimum pixel value available in the halftone dot image area when it is determined that the value of the target pixel should be decreased.

12. The image processing apparatus according to claim 8, wherein said halftone dot image binarizing unit obtains a difference between the value of the target pixel and the changed value thereof, and restrains the changed value when the changed value is larger than a given threshold value.

13. The image processing apparatus according to claim 8, wherein said halftone dot binarizing unit binarizes original values of the target pixels that are not changed and changed values of other target pixels by using a threshold value for binarization.

14. The image processing apparatus according to claim 1, wherein said line drawing/character smoothing unit counts a number of black pixels in each row or column in a given area of the input image corresponding to the line drawing/character area map, and detects the jaggy contained in the input image on the basis of the rations of black pixels between rows or columns.

15. The image processing apparatus according to claim 14, wherein said line drawing/character smoothing unit sets a mask in the given area to count the number of black pixels in each row or column in said mask, and shifts the mask to count the number of black pixels only in a new row or column that is not included in the mask before shifting, so that the jaggy can be detected by the numbers of black pixels before and after the mask is shifted.

16. An image processing method that processes a binary image, comprising:

inputting the binary image as a multi-valued image;

searching for a halftone dot image area in the multi-valued image according to a process comprising:

recognizing halftone dots in the multi-valued image;

generating a list of halftone dot information comprising center-of-gravity information about centers of gravity of the halftone dots, as information about each recognized halftone dot;

eliminating an erroneously recognized halftone dot according to a process comprising:

plotting the centers-of-gravity of the recognized halftone dots in a plot area ensured in advance, determining a shape and a size of masks to serve as search areas based upon an input resolution of the binary image, arranging the masks to include a center-of-gravity of a target halftone dot, counting a number of centers-of-gravity of the halftone dots for each of the arranged masks, determining a high possibility that noise and/or dust on the binary image may be erroneously recognized as halftone dots, if the number of the centers-of-gravity of the halftone dots is equal to or smaller than a threshold value, eliminating information about the centers-of-gravity of erroneously recognized halftone dots from the list and the plot area, and creating a halftone dot image area map according to the halftone dot information list from which the erroneously recognized halftone dot information has been eliminated;

recognizing a line drawing/character image area in the multi-valued image;

creating a line drawing/character image area map according to the recognizing of the line drawing/character image area;

binarizing an input image corresponding to the halftone dot image area map created based upon the eliminating the erroneously recognized halftone dot, while suppressing input read errors occurred at a time of the inputting of the binary image by optimizing a value of a target pixel to be binarized, and generating a binarized halftone dot image;

smoothing a jaggy that may be contained in an input image corresponding to the line drawing/character area map and thus generating a binarized line drawing/character image; and combining the binarized halftone dot image and the binarized line drawing/character image.

* * * * *